(12) United States Patent
Burkhart et al.

(10) Patent No.: US 8,201,679 B2
(45) Date of Patent: Jun. 19, 2012

(54) CLUTCH SYSTEM

(75) Inventors: Dirk Burkhart, Klingenmuenster (DE); Alexander Dreher, Sinzheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 717 days.

(21) Appl. No.: 12/398,820

(22) Filed: Mar. 5, 2009

(65) Prior Publication Data
US 2009/0223772 A1   Sep. 10, 2009

(30) Foreign Application Priority Data
Mar. 6, 2008  (DE) .................. 10 2008 012 862

(51) Int. Cl.
*F16D 13/75* (2006.01)
*F16D 23/12* (2006.01)
(52) U.S. Cl. ............. 192/111.12; 192/70.252; 192/84.6; 192/99 S; 192/111.14
(58) Field of Classification Search .............. 192/84.6, 192/111.12, 111.14, 111.19, 111.5
See application file for complete search history.

(56) References Cited

U.S. PATENT DOCUMENTS

| | | | |
|---|---|---|---|
| 6,712,189 B2 * | 3/2004 | Hirt .............................. | 192/84.6 |
| 7,124,871 B2 | 10/2006 | Friedmann et al. | |
| 7,341,137 B2 * | 3/2008 | Ahnert .................... | 192/70.252 |
| 2009/0000900 A1 * | 1/2009 | Becht ....................... | 192/70.252 |

FOREIGN PATENT DOCUMENTS
DE    10 2004 009 832 A1    9/2004
* cited by examiner

*Primary Examiner* — Rodney Bonck
(74) *Attorney, Agent, or Firm* — Simpson & Simpson, PLLC

(57) ABSTRACT

An actively closed friction clutch actuated by a lever actuator and having an adjusting means, the lever actuator taking the form of a roller displaced radially by a spindle, which roller acts on a unilaterally suspended lever, the latter being displaced axially and acting axially on a clamping means such as a lever, lever spring or diaphragm spring. The adjusting means for compensating friction lining wear is enabled by an end stop position widened axially relative to a stop position of the lever, which end stop position is enabled by means of an engageable/disengageable stop. To distinguish the two stop positions, the force/travel characteristic line of the lever actuator is detected by the controller of the lever actuator.

7 Claims, 4 Drawing Sheets

CLUTCH SYSTEM

CROSS-REFERENCE TO RELATED APPLICATIONS

This application claims priority from German Patent Application No. 10 2008 012 862.7, filed on Mar. 6, 2008, which application is incorporated herein by reference.

FIELD OF THE INVENTION

The invention relates to a clutch system having at least one actively closed friction clutch with an adjusting means, the lever actuator, automatically controlled by a controller, acting axially by means of a roller driven by an electric motor by means of a spindle between a radially outer and a radially inner end stop on a lever for actuating a clamping means of the at least one friction clutch and adjustment for wear compensation of the at least one friction clutch being effected by a clutch stroke enlarged in the opening direction of the at least one friction clutch by an engageable/disengageable stop, which stop controls an end stop position axially widened relative to a non-adjusting, open stop position of the at least one friction clutch and effecting adjustment.

BACKGROUND OF THE INVENTION

Clutch systems having an actively closed friction clutch and being actuated by means of a lever are known from DE 10 2004 009 832 A1, as is the basic structure of a lever actuator. In such friction clutches an adjusting means may be present, which compensates abrasion-related axial wear of the friction linings, in that the pressure plate clamping the friction linings against an axially fixed counterpressure plate is spaced by the axial amount of the wear relative to the clamping means, for example a lever or diaphragm spring, by the amount of abrasion of the friction linings. Such an adjusting means consists for example of ramp rings rotatable relative to one another in the circumferential direction, one of which ramp rings is accommodated fixedly in the circumferential direction on the pressure plate or incorporated therein and a ramp ring provided with corresponding counter-ramps is accommodated rotatably on the first ramp ring. If adjustment is initiated, the rotatable ramp ring is rotated to a limited degree. Adjustment is initiated, in the case of the proposed clutch system, by overtravel of the clutch stroke, i.e. the distance traveled by the lever tips or the tips of the clamping means. The overtravel is initiated by an engageable/disengageable stop. In normal operation of the friction clutch, this engageable/disengageable stop forms a stop for the lever of the lever actuator acting on the lever tips of the clamping means. To effect adjustment, in adjusting operation the engageable/disengageable stop is moved away, for example swiveled out, such that the clamping means describes a larger clutch stroke to reach an end stop during an opening process. During the subsequent engaging process of the friction clutch, the increased clutch stroke partially rotates a worm wheel actuated by the overtravel, which worm wheel drives the rotatable ramp ring in the circumferential direction. The engageable/disengageable stop may be controlled automatically by means of a for example electrical actuator, which is controlled by a controller. In this respect, the controller may determine a requirement for adjustment from measured variables of the lever actuator, such as stop positions, actuator currents and/or loads. Alternatively, swiveling out of the engageable/disengageable stop may proceed mechanically when the engage travel of the clamping means is lengthened by a given amount. This is the case in particular when the friction linings have been abraded by a given axial amount.

In order to be able to adapt the lever actuator exactly to the predetermined clutch stroke and the characteristic line underlying actuation of the friction clutch and thus the actuator forces necessary therefore, exact knowledge of the starting points of the characteristic line, and thus of the position of the lever stop, is necessary.

BRIEF SUMMARY OF THE INVENTION

The object of the present invention is therefore the determination and verification of the lever stops.

The object is achieved by a clutch system having at least one actively closed friction clutch with an adjusting means, a lever actuator, automatically controlled by a controller, acting axially by means of a roller driven by an electric motor by means of a spindle between a radially outer and a radially inner end stop on a lever for actuating a clamping means of the at least one friction clutch and adjustment for wear compensation of the at least one friction clutch being effected by a clutch stroke enlarged in the opening direction of the at least one friction clutch by an engageable/disengageable stop, the engageable/disengageable stop controlling a clutch stroke enlarged relative to a non-adjusting, open stop position of the at least one friction clutch, a distinction between stop position and end stop position being detected by means of differing force/travel characteristic lines of the stop and end stop positions. By knowing the stop position from which the lever actuator actuates the clamping means of the friction clutch, it is possible to adapt the force characteristic line by way of the clutch stroke. It is furthermore possible to verify which stop position has been established by the engageable/disengageable stop. In this respect, the function of a stop engaged/disengaged by the controller may be verified or mechanical engagement/disengagement of the stop may be detected by the controller.

In an exemplary embodiment, the lever actuator for the roller may include at least one radially outer stop, against which the roller rests when the friction clutch is open, i.e. when the lever actuator is not under load. It has been found that a particularly good distinction between the stop positions is advantageous where play of the roller relative to the lever is advantageous when the roller is in the stop position against said stop and the lever rests against the engageable/disengageable stop. If the friction clutch is closed from the swiveled-in engageable/disengageable stop, the roller firstly travels over a load-free path, which requires correspondingly low actuator force, until the roller comes into contact with the lever and displaces the latter axially with the predetermined actuator force, such that the clamping means is displaced axially and closes the friction clutch.

In contrast, when the lever is swiveled out the lever arrives in the end stop position, in which the roller at its stop is clamped under pretension against the radially outer end stop by the lever as a result of the steeper position thereof. When the lever actuator is activated, first of all the pretension is reduced. Thereafter, the roller immediately travels a distance under load, applying pressure to the lever, whereby from the start of the movement an actuator force is necessary which is greater than the force during actuator actuation from the stop position in normal operation. The force profile within the overtravel between stop position and end stop position here results from the resultant lever ratios, the lever point being variably set by the roller itself.

Advantageously, the actuator forces are detected via the clutch stroke by the controller controlling the lever actuator and evaluated at least in the overtravel range between stop position and end stop position. By evaluation and comparison with predetermined limit values stored in the controller, it is possible to identify from which stop the lever actuator was moved. The overtravel may be evaluated over a lever travel range between the lever stop when the friction clutch is open and incipient torque transmission of the at least one friction clutch.

The actuator forces may be evaluated by means of the electrical variables of an electric motor used to operate the lever actuator, for example the operating current, the voltage drop, the power expended and the like. The actuator forces may be related to the distance traveled by the roller and/or that traveled axially by the lever tips of the lever, which correspond to the clutch stroke. Where the translational and lever ratios are known, an incremental travel sensor system of the electronically commutated electric motor may be used to determine these distances, said sensor system being calibrated in at least one position of the lever actuator.

The signals may advantageously be evaluated by testing the actuator forces for a maximum in the relevant range of the overtravel. If such a maximum arises, it may be assumed that the actuator movement started from the end stop position. Alternatively or in addition, if the actuator force is exceeded within the relevant overtravel, it is possible to infer, by way of an actuator force arising after this overtravel range, that movement of the lever took place from the end stop position. It may moreover be advantageous for the actuator forces of a movement out of the stop position to be used as baseline for the actuator forces from the end stop position.

If the initial position of the lever actuator is known, a typical characteristic line of the travel movement of the lever actuator for actuation of the friction clutch may be saved, such that, in conjunction with the lever forces of the lever actuator, the electric motor may be optimally energized, in order with low actuator force to achieve uniform actuation of the friction clutch according to a predetermined actuator characteristic line. In this case different actuator characteristic lines may be saved in the controller for the two stop positions and may be correctly used as basis for actuator energization, depending on the detected start position.

BRIEF DESCRIPTION OF THE DRAWINGS

The invention is explained in greater detail with reference to FIGS. 1 to 6, in which.

DETAILED DESCRIPTION OF THE INVENTION

Figure 1:
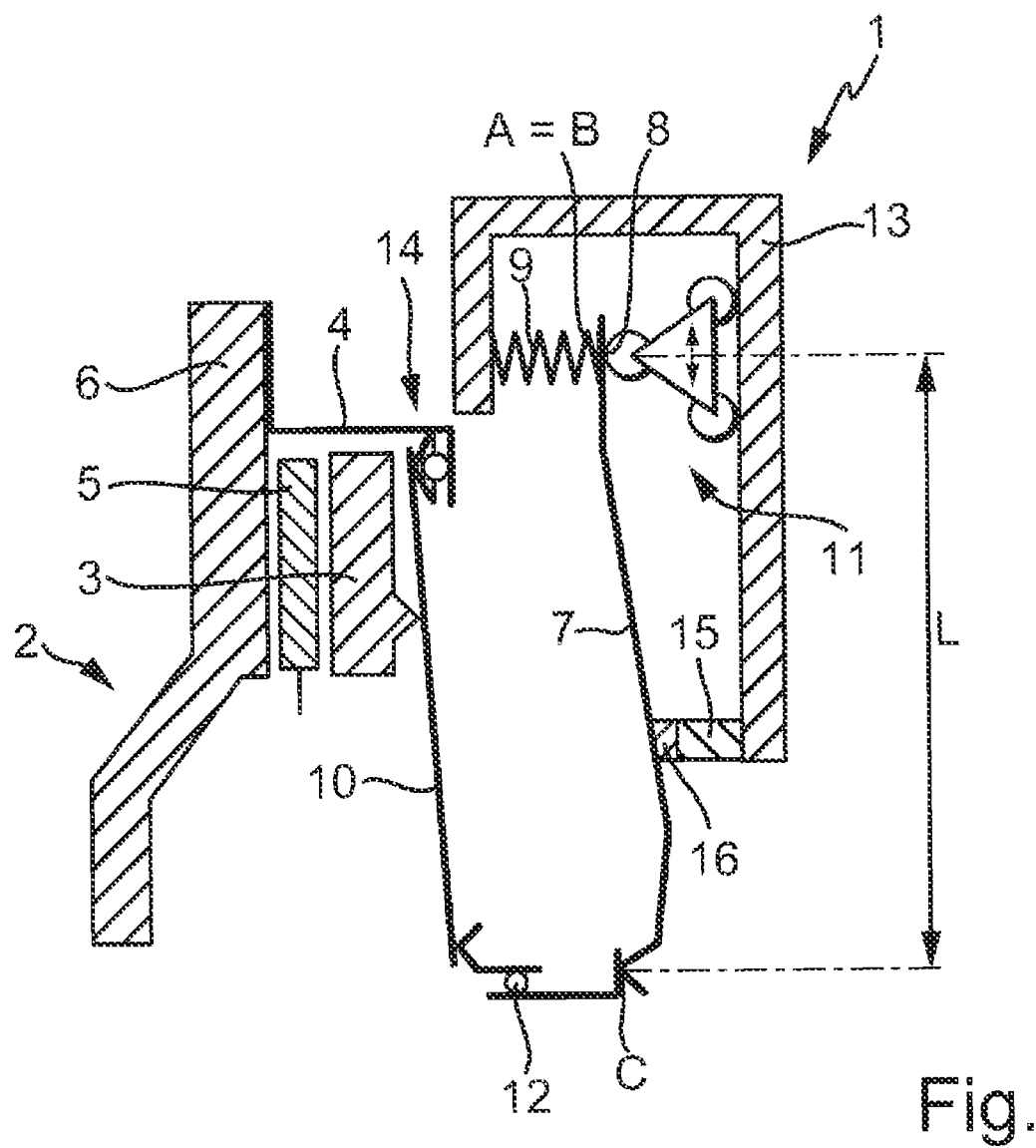
FIG. 1 shows an exemplary embodiment of a clutch system with lever actuator.

FIG. 1 is a schematic representation of a clutch system 1 with a friction clutch 2. The friction clutch 2 consists substantially of a counterpressure plate 6, a clutch disc 5, a pressure plate 3, a clutch cover 4 and a clamping means 10. The friction clutch 2 illustrated by way of example in FIG. 1 is an "actively closed" clutch, which is open when no force is applied and is closed by axial displacement of the clamping means 10 when a force predetermined by the lever actuator 11, which is here illustrated without drive, is applied to the clamping means 10, in that the friction surfaces of the clutch disc 5 on the one hand and the friction surfaces of the pressure plate 3 and the counterpressure plate 5 are brought into frictional engagement. Accordingly, the lever actuator 11 acts in the exemplary embodiment illustrated as a lever engager and the bearing on the clamping means 10 is an engage bearing 12, which uncouples by rotation the clamping means 10 turning with the friction clutch 2 from the lever 7 of the lever actuator 11.

The lever actuator 11 for the friction clutch 2 consists substantially of a lever system, which is arranged on a support 13 in such a manner as to be fixed to the housing. The lever actuator 11 acts by means of a lever 7 with a lever length L on the engage bearing 12, which is arranged around a gear input shaft, not shown here, and, as a thrust bearing, compensates the differences in speed between the friction clutch 2 rotating at engine speed and the lever 7 fixed to the housing.

In FIG. 1 the spring means, here in the form of a compression spring 9, the radially outer lever end of the lever 7 with the bearing point A, a roller 8 displaceable between the two ends of the lever 7 with the bearing point B and the bearing point C resting at the radially inner lever end against the engage bearing 12 lie substantially on a line of action. The friction clutch 2 is actuated in that the roller 8 is displaced, as a result of which the lever 7 is displaced at bearing point C against the force of the compression spring 9. In the exemplary embodiment shown, the friction clutch 2 is open, and the bearing points A and B therefore coincide in the radially outer position of the roller. To close the friction clutch 2, the displaceable roller unit 8 runs directly inwards over a substantially radial sub-surface of the lever 7 while being supported on a base plate or on the gearbox casing wall. The lever 7 shown in FIG. 1 is not flat. Instead, it is concavely shaped to a degree from the point of view of the roller 8, whereby force generation may be adapted to the clamping means 10 and thus to the friction surfaces of the friction clutch. The roller 8 is accommodated rotatably on a crossbar, which rolls on the base plate by means of further rollers.

When the roller 8 or the bearing point B is in the position shown in FIG. 1, the resilience of the energy accumulator 9 acts on a lever length L which is equal to zero. Therefore no moment of the lever 7 is able to act on the engage bearing 12. If the roller 8 is then moved radially towards the engage bearing 12, the lever length L between the energy accumulator 9 and the point of rotation increases ever further. At the same time, the lever length between the bearing point B conveyed with the roller 8 to the bearing point C on the engage bearing 12 shortens. Displacement of the bearing point B changes the force acting on the engage bearing 12, whereby the engage force becomes greater, the closer the bearing point B gets to the engage bearing 12. Conversely, the force ratios have the effect that, in the absence of a force acting on the roller 8, the latter is moved radially outwards away from the engage bearing 12, such that the friction clutch 2 is disengaged again. In this way, a self-opening action of the friction clutch 2 may be simply achieved. This effect is especially advantageous in particular in the case of use with a double clutch.

As a consequence for example of wear in the friction linings of the clutch disc 5 or setting losses of lining resilience between friction linings and the clutch disc 5, the axial spacing between pressure plate 3 and counterpressure plate 6 is subject to changes over the service life of the friction clutch 2, which become apparent inter alia from a lengthening of the engage travel of the clamping means 10. Such changes to the engage travel become negatively apparent in the design of the lever actuator 11, since the components and the forces arising in the friction clutch 2 and in the lever actuator 11 have to be designed to take account of these changes over the service life. In the friction clutch 2 an adjusting means 14 is therefore provided, which provides compensation between clutch cover 4 and clamping means 10 corresponding to the incorrect spacing between pressure plate 3 and counterpressure plate 6, in that ramps ascending in the circumferential direction increase axial spacing between clutch cover 4 and clamping means 10 through rotation. In the non-adjusting state of the clutch, these ramps are impeded for example by friction or form-fit with regard to rotation in the circumferential direction and thus with regard to undesired adjustment. If the clamping means 10 is moved beyond a predetermined clutch stroke, a ramp ring of the adjusting means 14 is rotated in the circumferential direction relative to ramps provided on the pressure plate 3 until said ramp ring has compensated a predetermined spacing or the spacing arising as a result of the overtravel of the clamping means 10, ideally the incorrect spacing. It goes without saying that other advantageous adjusting means, such as for example the above-described adjusting means with a spring-loaded screw, which with each adjustment compensates only limited engage travel, may likewise be advantageous, in particular if it is necessary to prevent the setting of excessive adjusting travel.

Of crucial significance for correct adjustment is the setting of correct overtravel to extend the clutch stroke necessary for adjustment. The lever engager 11 is therefore designed such that its lever 7 returns automatically, for example under spring loading, or driven by an actuator, for example an electric motor, to a neutral position, the stop position, when the friction clutch 2 is open, which position is formed in the non-adjusting state by a stop 15 fixed to the housing, on which is additionally arranged an engageable/disengageable stop 16. The axial positioning of the two stops is such that no adjustment takes place. If it is established, as a result of extended axial engage travel, that adjustment is necessary, the engageable/disengageable stop 6 is moved away out of the axial path of the lever 7, such that the latter may effect further overtravel going beyond the neutral position, this leading to an increased clutch stroke effecting adjustment using the adjusting means 14.

Figure 2:
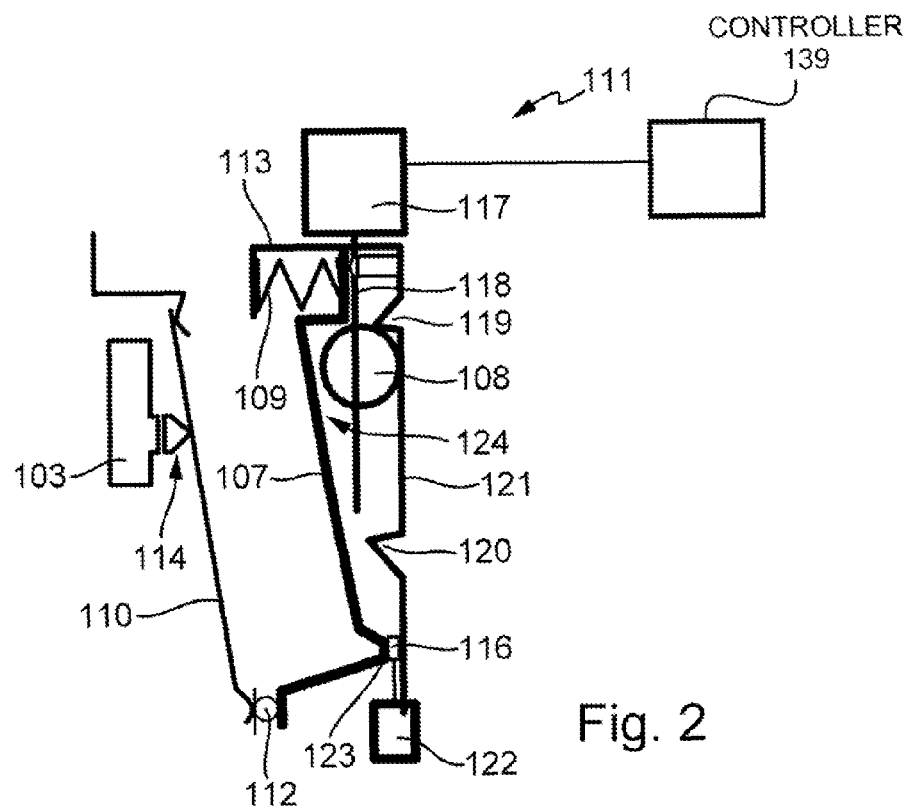
FIG. 2 is a schematic representation of a lever actuator in the stop position.

FIG. 2 is a schematic representation of a lever actuator 111 modified slightly relative to the lever actuator 11 in FIG. 1. The lever actuator 111 contains an electric motor 117, which drives by means of a spindle 118, which engages in a crossbar, not shown, with a spindle nut, and thereby in the case of rotary drive of the spindle 118, the roller 108 attached thereto radially between the radially outer roller stop 119 and the radially inner roller stop 120. In this case, the roller 108 acts, on its radial travel, on the lever 107, said roller resting via the crossbar on the base plate 121. To this end, further rollers are accommodated on the crossbar, in order to compensate the different rotational movements of the rolling movement of the roller 108 on the lever 107 and the rolling movement on the base plate 121. The lever 107 is clamped at its radially outer end by means of the energy accumulator 109 together with the support 113, which may form the housing of the lever actuator 111. At its opposing end, the lever 107 acts axially via an engage bearing 112 on the clamping means 110, which thereby axially displaces the pressure plate 103 and closes the friction clutch. Between the pressure plate 103 and the clamping means there is indicated an adjusting means 114, for example in the form of two ramp rings rotatable relative to one another, which, if adjustment is initiated, enlarges the spacing between pressure plate 103 and clamping means 110, for example by limited rotation of one ramp ring relative to the other, and thus compensates a decrease in friction lining thickness caused by wear.

An adjusting process is initiated by enlargement of the clutch stroke, i.e., of the travel between the open and completely closed states of the friction clutch. To this end, an engageable/disengageable stop 116 is provided for the lever 107, which stop is displaceable by a swivel means 122 and changes over between two stop states. The stop state in which the engageable/disengageable stop 116 is not swiveled out corresponds to the stop position 123 in normal operation of the friction clutch, in which no adjustment is effected. Starting from this stop position 123, the lever actuator 111 is started so as to initiate closure of the friction clutch, in that the electric motor 117 displaces radially inwards the roller 108 located at the radially outer roller stop 119. As a consequence of the stop position 123 of the lever 107 and the resultant slope of the lever 107, play 124 arises at the radially outer roller stop 119 between roller 108 and lever 107, such that the actuator force to be applied by the electric motor 117 is close to zero until the play 124 is used up. An actuator force for actuating the clamping means 110 then arises, as a function of the engage force necessary to actuate the clamping means 110 and the radially varying lever point, which is set by the radially moving roller 108, and of the lever profile of the lever 107 and the clamping force of the energy accumulator 109. The lever profile and the characteristic line of the energy accumulator 109 may ideally be set such that the actuator force is uniform over the clutch stroke and the friction clutch is self-opening without energization of the electric motor 117.

An adjustment process may be initiated as a function of operating data of the lever actuator 111 by the controller 139, controlling the electric motor 117. To this end, the engageable/disengageable stop 116 may be swiveled out by means of an automatically actuated swivel means 122, for example by means of an electric motor or by means of an electromagnet. It is advantageous to use a mechanical swivel means 122, which detects the clutch stroke and, if a predetermined clutch stroke is exceeded as a consequence of wear to the friction linings, swivels out the engageable/disengageable stop 116.

Figure 3:
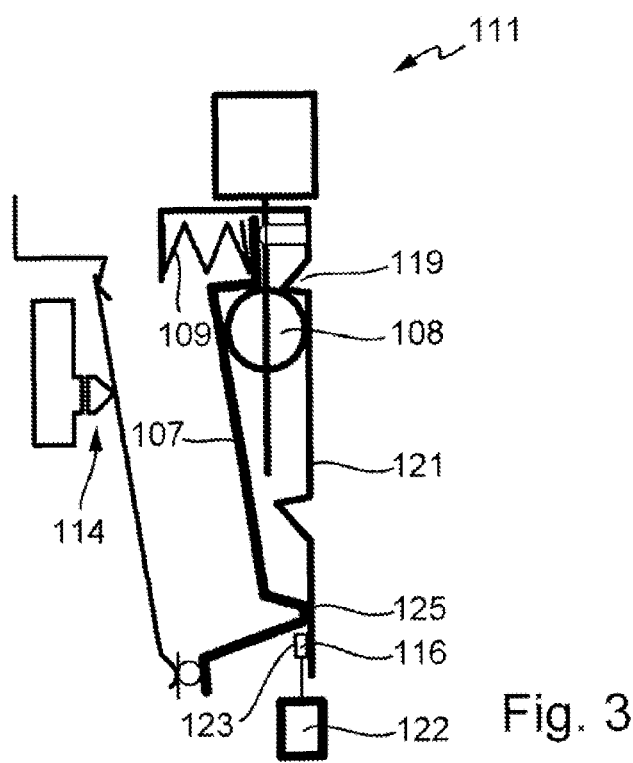
FIG. 3 is a schematic representation of a lever actuator in the end stop position.

FIG. 3 shows the lever actuator 111 of FIG. 2 after the stop 116 has been swiveled out by the swivel means 122. In the open state of the friction clutch, the lever 107 rests against the base plate 121, such that the lever 107 adopts an end stop position 125, which on the next closure of the friction clutch brings about a larger clutch stroke, so initiating an adjusting process of the adjusting device 114. As a consequence of the lever 107 being displaced further back in the end stop position 125, the lever 107 remains in contact with the roller 108 lying against the radially outer roller stop 119 or clamps said roller at least to a small degree against the roller stop 108. The start of closure from the end stop position 125 of the lever 107 therefore immediately causes a greater actuator load relative to a start from the stop position 123, so bringing about greater actuator forces. Furthermore, the characteristic line of the engage force over the clutch stroke is modified. Therefore different actuator forces arise over the clutch stroke, which are not detected by the controller in particular when mechanical swiveling of the engageable/disengageable stop is used. Thus, during an adjustment procedure, only some of the spacing to be adjusted may be compensated as a result of a small adjustment range, such that during the next closure of the friction clutch the engageable/disengageable stop 116, which swivels in again after each adjustment procedure, is swiveled out again.

Advantageously, therefore, the actuator loads in the overtravel range starting from the stop position 123 or the end stop position 125 are evaluated up until the actuator loads coincide in the case of incipient moment transmission of the friction clutch, for example up until the point of contact thereof, in that for example the actuator currents are determined by the controller and compared with predetermined setpoints. In this way the respective stop position may be determined in the controller, the actuator currents may be adapted and detection of the number of adjustment procedures is possible, whereby corresponding information about the state of wear of the friction clutch may be detected and assessed in the controller.

Figure 4:
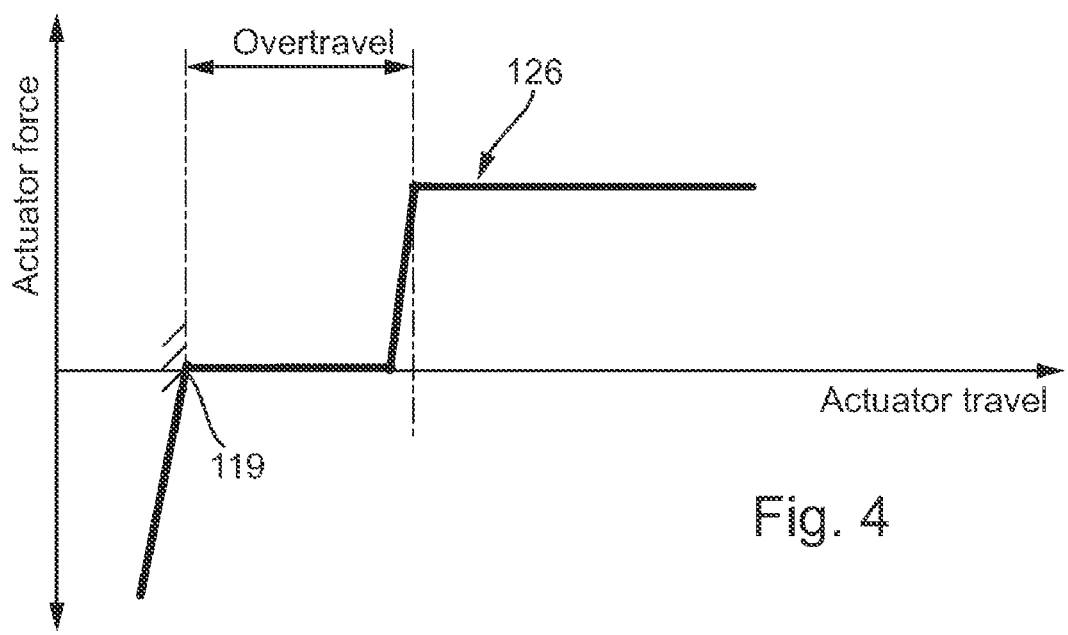
FIG. 4 is a diagram plotting the actuator force against actuator travel starting from the stop position.

FIG. 4 shows in conjunction with FIGS. 2 and 3 a typical profile 126 for the lever actuator 111 of FIG. 2 for closure of a friction clutch along the actuator travel starting from the roller stop 119, wherein the lever 107 rests in the stop position 123. As a consequence of the play 124 established between the roller 108 and the lever 107, the actuator force is virtually zero in the overtravel range until the play has been used up, since only frictional forces arise. Once the play 124 has been used up, the lever 107 is displaced axially and acts on the clamping means 110, such that in the continuation of the profile a constant actuator force is established.

Figure 5:
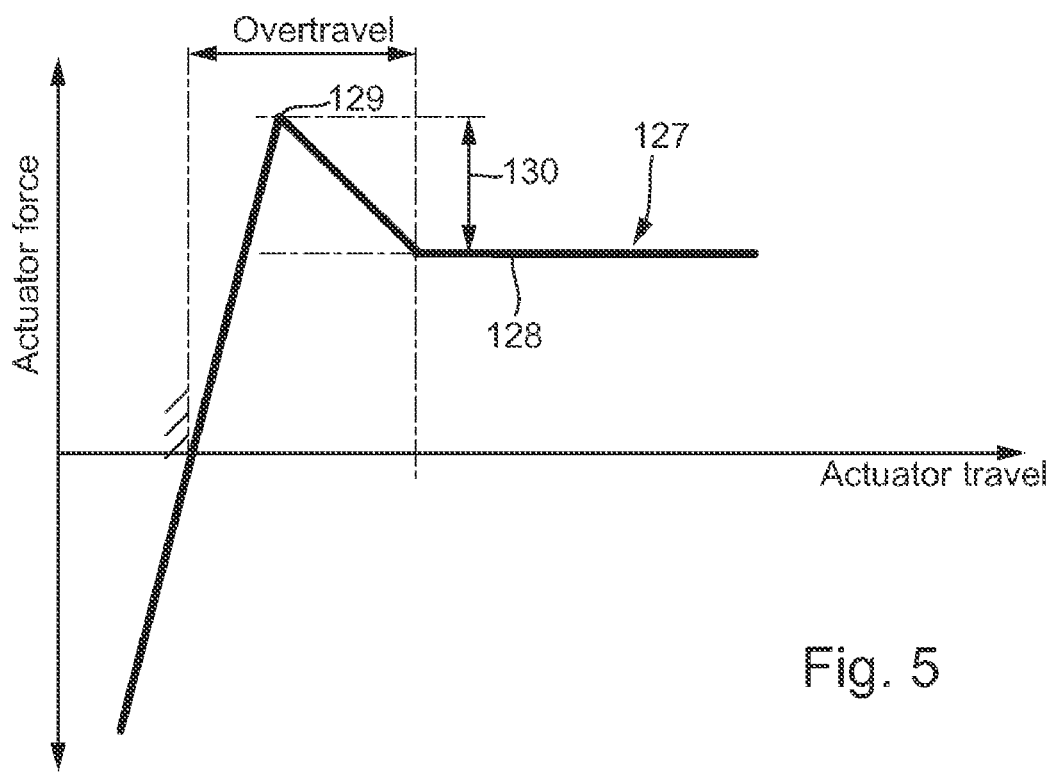
FIG. 5 is a diagram plotting the actuator force against actuator travel starting from the stop position; and, FIG. 6 is a diagram of the engage force over the clutch stroke with mechanical engagement/disengagement of the engageable/disengageable stop.

FIG. 5 shows in conjunction with FIGS. 2 and 3 a typical profile 127 for the lever actuator 111 in the end stop position 125 for closure of a friction clutch, as shown in FIG. 3. Here the roller 108 rests right at the start of rotary drive by the electric motor against the lever 107, such that an actuator force has to be applied immediately, which increases sharply as a result of the unfavorable lever conditions and exceeds the actuator force 128 for actuating the clamping means by an amount 130 and under more favorable lever ratios falls back to the actuator force 128 for actuating the clamping means after passing through a maximum 129 and overcoming the overtravel.

Evaluation of the actuator forces of FIGS. 4 and 5 in the controller may result in unambiguous assignment of stop and end stop position and thus indirect determination of adjustment procedures may be identified. In this way, both the absolute level and/or the shape of the actuator force behavior may be evaluated. For example, the actuator forces or auxiliary variables such as actuator current or power may be differentiated, such that the end stop position may be inferred from the presence of the maximum 129. Force generation starting from the stop position may serve as datum line for actuator currents which increase during operation over service life.

Figure 6:
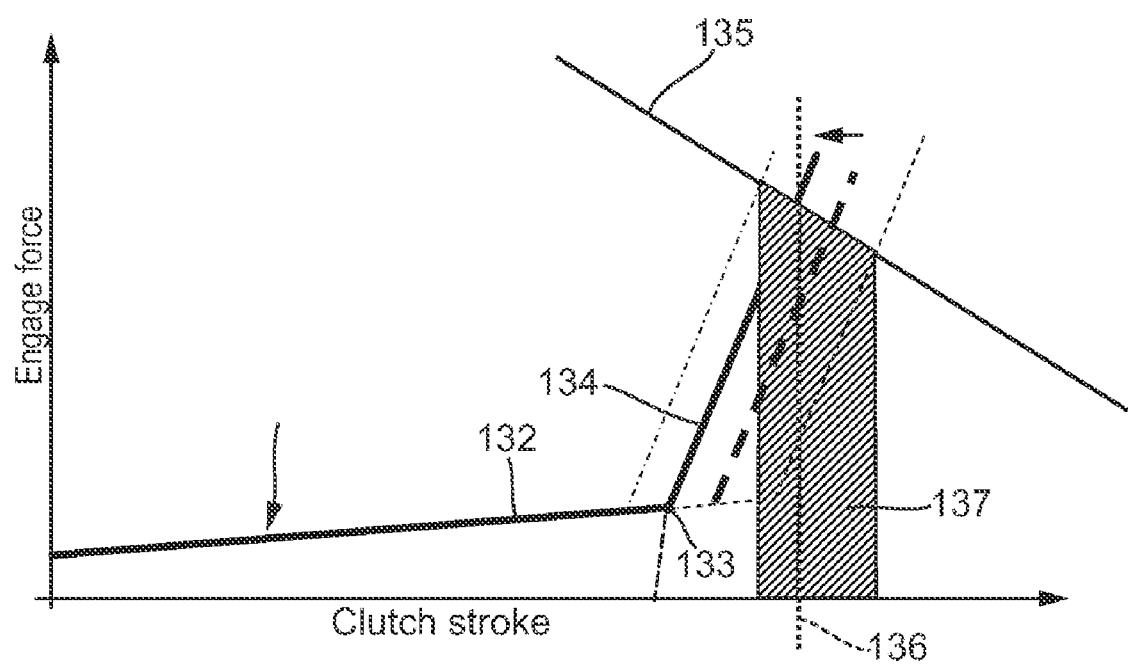

FIG. 6 shows a typical characteristic line 131 for the engage force over the clutch stroke. The characteristic line 131 has two stages, with a characteristic line branch 132 as far as the point of contact 133 and a second characteristic line branch 134, in which the friction clutch increasingly transmits torque over the clutch stroke. The line 135 reproduces the actuator force necessary for the corresponding clutch stroke, from which it is clear that, as a consequence of the lever ratios established at the lever actuator, the actuator force decreases with an increasing clutch stroke. In the representation in FIG. 6, mechanical engagement/disengagement of the engageable/disengageable stop is provided, wherein the engageable/disengageable stop is released at an engagement/disengagement point 136 in the case of a predetermined clutch stroke, which corresponds to a predetermined engage force in the case of a predetermined actuator force. The engagement/disengagement point 136 is subject to a tolerance window 137, shown by crosshatching, within which the characteristic line branch 134 has to lie with its tolerance deviation, which is shown as a broken tolerance line 138.

| List of reference numerals | |
|---|---|
| 1 | Clutch system |
| 2 | Friction clutch |
| 3 | Pressure plate |
| 4 | Clutch cover |
| 5 | Clutch disc |
| 6 | Counterpressure plate |
| 7 | Lever |
| 8 | Roller |
| 9 | Compression spring |
| 10 | Clamping means |
| 11 | Lever actuator |
| 12 | Engage bearing |
| 13 | Support |
| 14 | Adjusting means |
| 15 | Stop fixed to housing |
| 16 | Engageable/disengageable stop |
| 103 | Pressure plate |
| 107 | Lever |
| 108 | Roller |
| 109 | Energy accumulator |
| 110 | Clamping means |
| 111 | Lever actuator |
| 112 | Engage bearing |
| 113 | Support |
| 114 | Adjusting means |
| 116 | Engageable/disengageable stop |
| 117 | Electric motor |
| 118 | Spindle |
| 119 | Radially outer roller stop |
| 120 | Radially inner roller stop |
| 121 | Base plate |
| 122 | Swivel means |
| 123 | Stop position |
| 124 | Play |
| 125 | End stop position |
| 126 | Profile |
| 127 | Profile |
| 128 | Actuator force |
| 129 | Maximum |
| 130 | Amount |
| 131 | Characteristic line |
| 132 | Characteristic line branch |
| 133 | Point of contact |
| 134 | Characteristic line branch |
| 135 | Line |
| 136 | Engagement/disengagement point |
| 137 | Tolerance window |
| 138 | Tolerance line |
| A | Bearing point |
| B | Bearing point |
| C | Bearing point |
| L | Lever length |

What is claimed is:

1. A clutch system having at least one actively closed friction clutch with an adjusting means, a controller, and a lever actuator including a lever, wherein:
the lever actuator is automatically controlled by the controller;
the lever actuator acts axially, by means of a roller driven by an electric motor by means of a spindle between a radially outer and a radially inner roller stop, on the lever to actuate a clamping means of the at least one friction clutch and adjustment for wear compensation of the at least one friction clutch being effected by a clutch stroke enlarged in the opening direction of the at least one friction clutch by an engageable/disengageable stop, the engageable/disengageable stop controlling an end stop position widened relative to a non-adjusting, stop position of the at least one friction clutch and bringing about an enlarged clutch stroke; and, a distinction between the stop position and the end stop position is detected by means of differing force/travel characteristic lines of the stop and end stop positions.

2. The clutch system as claimed in claim 1, wherein, when the lever is located at the stop position, the roller located at the radially outer roller stop displays play relative to the lever.

3. The clutch system as claimed in claim 2, wherein, when the lever is located at the end stop position, the roller is clamped by the lever under pretension against the radially outer roller stop.

4. The clutch system as claimed in claim 3, wherein, in an overtravel lever travel range between a stop of the lever when the friction clutch is open and a point of contact of the at least one friction clutch, the actuator force/actuator travel characteristic line is detected and evaluated by the controller.

5. The clutch system as claimed in claim 4, wherein, in the event of an actuator force maximum arising in the overtravel lever travel range, a movement of the lever out of the end stop position is identified.

6. The clutch system as claimed in claim 4, wherein, in the event of the actuator force within the overtravel lever travel range exceeding an actuator force arising after the travel range, a movement of the lever out of the end stop position is detected.

7. The clutch system as claimed in claim 5, wherein, in the event of the actuator force within the overtravel lever travel range exceeding an actuator force arising after the travel range, a movement of the lever out of the end stop position is detected.

* * * * *